Oct. 6, 1936.  W. C. HEISKELL  2,056,518

SPACER BALANCE FOR CREAM SEPARATOR BOWLS

Filed Jan. 2, 1936

Inventor
William C. Heiskell,

By Clarence A. O'Brien and
Hyman Berman Attorneys

Patented Oct. 6, 1936

2,056,518

UNITED STATES PATENT OFFICE 2,056,518

SPACER BALANCE FOR CREAM SEPARATOR BOWLS

William C. Heiskell, Joplin, Mo.

Application January 2, 1936, Serial No. 57,281

2 Claims. (Cl. 233—41)

This invention relates to new and useful improvements in cream separators and more particularly to means for association with the skimming disks which in use will eliminate a considerable number of disks, thus saving considerable work and worry, besides ultimate expense.

The skimming disks now used in the majority of cream separators are generally kept spaced and in stable order by a rather frail means which frequently wear down or breaks and causes a dancing or wobbling action of the disks, the vibration of which results in unnecessary and frequently disastrous damage on the separating machine. The only known remedy at present is to add more disks to the bowl which eventually press the old disks so closely together that the bowl either explodes by blowing off the bowl nut or else becomes so top heavy that it will no longer spin.

It is therefore the principal object of the present invention to provide a spacer balance for cream separator disks which will eliminate much of the trouble now encountered in cleaning and repairing a cream separator.

Another important object of the invention is to provide a spacing balance of the character stated which will materially reduce the number of disks now required in cream separators.

These and various other important objects and advantages of the invention will become apparent to the reader of the following specification.

Figure 1:
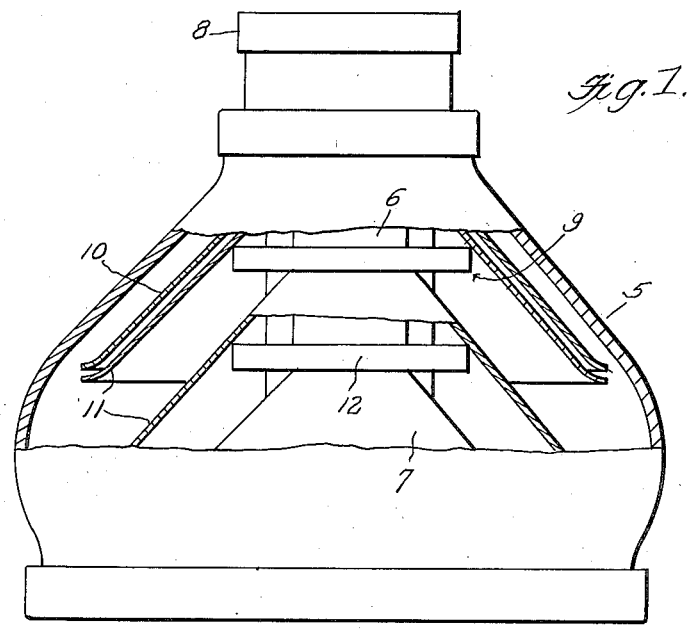
Figure 1 represents a fragmentary vertical sectional view through a cream separating bowl, showing the spacing balance installed therein.
Figure 2:
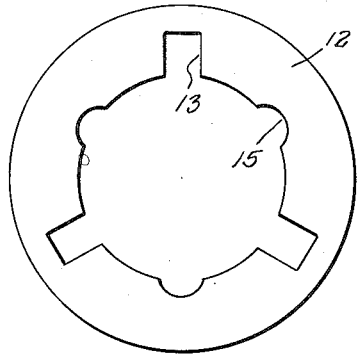
Figure 2 represents a top plan view of one of the balance units.
Figure 3:
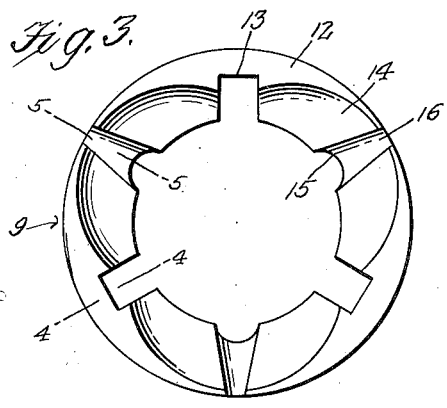
Figure 3 is a bottom plan view of one of the balance units.
Figure 5:
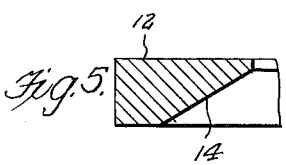
Figure 5 is a sectional view taken substantially on line 5—5 of Figure 3.

Referring to the drawing wherein like numerals designate like parts, it can be seen that numeral 5 represents a cream separator bowl in which the distributor 6 is mounted. Numeral 7 represents the bowl stem, while numeral 8 represents the usual bowl nut. Reference character 9 generally refers to the spacing balancers arranged on the distributor. In the upper portion of the bowl is the dividing or cream disk 10, while below this disk are the skimming disks 11, all of conventional shape.

The spacing balance units 9 for the disks, which I refer to by numeral 9 are each in the form of an annulus 12 provided with radially extending cut-outs 13, extending from the inner edge of the annulus and terminating inwardly of the outer edge or periphery of the annulus and extending vertically through the annulus.

Semi-circular concavities 14 are provided on the bottom side of the annulus 12 and each concavity extends from one cut-out 13 to the next cut-out 13, these cut-outs being equally spaced around the annulus.

Furthermore at points between the cut-outs 13 the inner edge portion of the annulus is provided with notches 15 extending vertically through the annulus and from these notches, on the bottom side of the annulus grooveways 16 extend and open through the periphery of the annulus.

Figure 4:
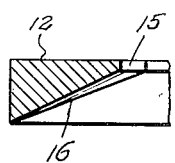
Figure 4 is a section on line 4—4 of Figure 3.

These grooveways 16 as shown in Figure 4 gradually deepen from the periphery of the annulus 12 inwardly to the inner edge thereof at the notches 15.

While the foregoing specification sets forth the invention in specific terms, it is to be understood that numerous changes in the shape, size and materials may be resorted to without departing from the spirit and scope of the invention as claimed hereinafter.

Having thus described the invention, what is claimed as new is:

1. A disk spacer for cream separators comprising an annulus provided with cut-out portions extending from the inner edge thereof outwardly and terminating inwardly of the periphery of said annulus, and a radially disposed grooveway extending across one side of the annulus between each pair of cut-out portions, and a grooveway extending across the annulus between each pair of cut-out portions.

2. A disk spacer for cream separators comprising an annulus provided with cut-out portions extending from the inner edge thereof outwardly and terminating inwardly of the periphery of said annulus, and a radially disposed grooveway extending across one side of the annulus between each pair of cut-out portions, and a grooveway extending across the annulus between each pair of cut-out portions, said grooveways each increasing in depth from the periphery of the annulus to the inner edge thereof.

WILLIAM C. HEISKELL.